United States Patent [19]
Friedline et al.

[11] Patent Number: 6,148,851
[45] Date of Patent: Nov. 21, 2000

[54] VALVE LOCK APPARATUS AND LOCKABLE VALVE

[75] Inventors: Gary W. Friedline, New Alexandria; Michael W. Kromer, Mt. Pleasant, both of Pa.

[73] Assignee: PBM, Inc., Irwin, Pa.

[21] Appl. No.: 09/291,356

[22] Filed: Apr. 14, 1999

[51] Int. Cl.⁷ ................................................. F16K 35/06
[52] U.S. Cl. .......................... 137/385; 251/104; 251/105; 251/110; 70/177; 70/180
[58] Field of Search ................................. 137/383, 385; 251/105, 106, 110, 104, 102, 101, 93; 70/177, 207, 224, 180

[56] References Cited

U.S. PATENT DOCUMENTS

| | | |
|---|---|---|
| 3,228,415 | 1/1966 | Geiss . |
| 4,909,275 | 3/1990 | Massey et al. ................... 251/104 X |
| 5,014,528 | 5/1991 | Roberts . |
| 5,183,073 | 2/1993 | Roberts . |
| 5,213,308 | 5/1993 | Jeromson et al. ................... 251/106 X |
| 5,449,144 | 9/1995 | Kowalics . |
| 5,579,804 | 12/1996 | Roberts . |
| 5,709,112 | 1/1998 | Kennedy . |

*Primary Examiner*—Kevin Lee
*Attorney, Agent, or Firm*—Kirkpatrick & Lockhart LLP

[57] ABSTRACT

A lock apparatus for a valve that has a valve body and an actuator stem protruding therefrom for selectively rotating a flow control member within the valve body between open and closed positions and a handle attached to the valve stem that defines a first axis. The lock apparatus includes a slider plate that is movably supported on the valve stem and is selectively slidable along a second axis that is substantially transverse to the first axis to a position wherein said slider plate contacts a portion of the valve body when the flow control member is in either of the open and closed positions to retain the flow control member therein and another position wherein the slider plate does not contact the portion of the valve body to permit the valve stem to be rotated. An opening is provided through the slider plate for receiving a portion of a locking device therethrough.

37 Claims, 8 Drawing Sheets

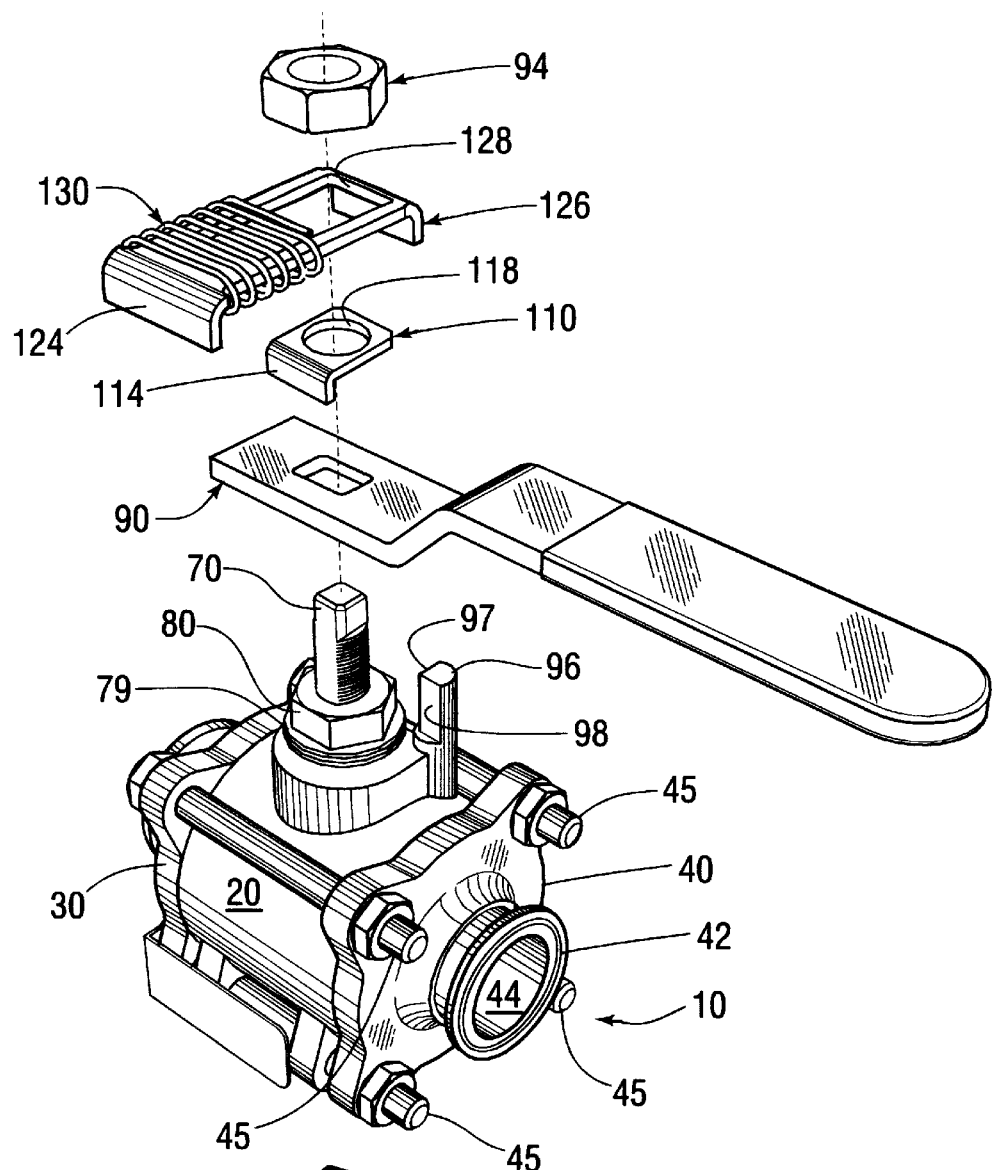
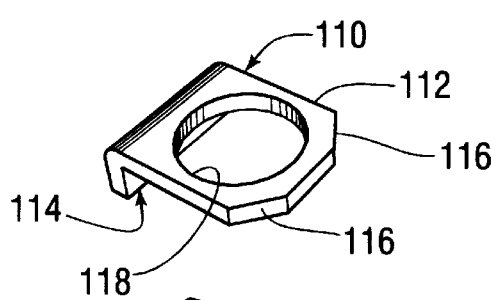
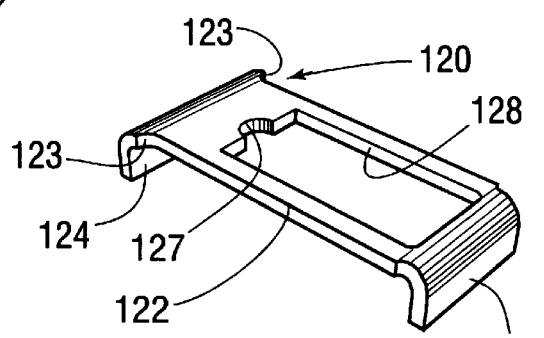

VALVE LOCK APPARATUS AND LOCKABLE VALVE

CROSS-REFERENCE TO RELATED APPLICATIONS

Not applicable.

FEDERALLY SPONSORED RESEARCH

Not applicable.

BACKGROUND OF THE INVENTION

1. Field of the Invention

The present invention relates to valves and, more particularly, to a locking assembly for retaining and, if desired, locking a flow control member of a valve in an open or closed position.

2. Description of the Invention Background

Over the years, a variety of different types of valves for controlling the flow of fluids, vapors, slurries, etc. in pipelines or conduits have been developed. Examples of such flow control valves are butterfly valves, plug valves, globe valves, gate valves, diaphragm valves and ball valves. Each of these types of valves generally have different flow and pressure characteristics due to their different configurations.

On problem that is common to all valves, regardless of their particular construction, is the inability to lock such valves in a desired open or closed position to prevent their unauthorized actuation without the use of complicated and expensive locking mechanism. The reader will appreciate that such need to lock valves to prevent unauthorized actuation can arise in a variety of different settings and applications. For example, such ability is often desirable when valves are employed in pipelines that pass through remote areas to guard against vandalism and tampering. In manufacturing plants, it is often desirable to use valves that can be easily locked during process maintenance operations to prevent the valve from being inadvertently opened which could result in injuries to the maintenance personnel and equipment located downstream of the valve. In addition, valves are often used in locations wherein they are susceptible to the inadvertent application of forces which could cause them to be accidentally opened or closed. In such instances, it is desirable to employ a valve that has a means for retaining the flow control member thereof in a desired position even under the accidental application of a force to its actuation member.

A variety of different valve locking mechanisms have been developed which purport to address such problems. Examples of such mechanisms are disclosed in U.S. Pat. No. 3,228,415 to Geiss, U.S. Pat. No. 4,126,023 to Smith et al., U.S. Pat. Nos. 5,014,528, 5,183,073, and 5,579,804 to Roberts, U.S. Pat. No. 5,449,144 to Kowalics, and U.S. Pat. No. 5,709,112 to Kennedy. Each of those mechanisms, however, are relatively complicated to manufacture, assemble and install on the valve.

Therefore, there is a need for a locking apparatus that can be used in connection with a variety of different valve configurations that is easy to manufacture, install and operate.

There is a further need for a valve locking apparatus that can prevent the inadvertent actuation of a valve.

There is still another need for a valve locking apparatus that can be used in connection with a variety of different commercially available locks to prevent unauthorized actuation of a valve.

Yet another need exists for a locking apparatus that can be used in connection with a valve that can be actuated manually or automatically.

Another need exists for a valve locking apparatuses that can be easily retrofitted onto the valve stems of existing valves.

An additional need exists for a valve that has a means for preventing accidental actuation of the flow control member of the valve.

Still another need exists for a valve that has a locking apparatus that enables the flow control member of the valve to be locked in a desired position to prevent the unauthorized actuation thereof.

SUMMARY OF THE INVENTION

In accordance with a particularly preferred form of the present invention, there is provided a lock apparatus for a valve that has a valve body and an actuator stem protruding therefrom for selectively rotating a flow control member within the valve body between open and closed positions. The valve also has a handle that is attached to the valve stem; the handle defines a first axis. In a preferred form, the lock apparatus comprises a slider plate movably supported on the valve stem. The slider plate is selectively slidable along a second axis that is substantially transverse to the first axis to a position wherein the slider plate contacts a portion of the valve body when the flow control member is in either of the open and closed positions to retain the flow control member therein and another position wherein the slider plate does not contact the portion of the valve body to permit rotation of the valve stem.

Another embodiment of the present invention comprises a lock apparatus for a valve that has a valve body and a rotatable actuator stem protruding therefrom for selectively rotating a flow control member within the valve body. The valve has a handle attached to the valve stem that defines a first axis. The locking apparatus comprises a slider plate that is movably supported on the valve stem and is selectively slidable along a second axis that is substantially transverse to the first axis. The slider plate is slidable to a first retaining position wherein the slider plate contacts a first contact surface on the valve body when the flow control member is an open position to retain the flow control member in the open position and a second position wherein the slider plate does not contact the first contact surface to permit the valve stem to be rotated to a closed position.

Another embodiment of the present invention comprises a lock apparatus for a valve that has a valve body and a rotatable actuator stem protruding therefrom for selectively rotating a flow control member within the valve body between first and second positions. The valve has a handle attached to the valve stem that defines a handle axis. The locking apparatus comprises a spacer member received on the valve stem and a slider plate slidably retained on the spacer member for selective slidable travel thereon along a locking axis that is substantially transverse to the handle axis. The slider plate is selectively movable between a position wherein the slider plate contacts a portion of the valve body when the flow control member is in either of first and second positions to retain the flow control member therein and another position wherein the slider plate does not contact a portion of the valve body to enable the valve stem to be rotated.

Another embodiment of the present invention comprises a lock apparatus for a valve that has a valve body and a rotatable actuator stem protruding therefrom for selectively rotating a flow control member within the valve body between first and second positions. The lock apparatus comprises a slider plate that is slidably received on the valve stem. The slider plate has an elongated opening therethrough. The lock apparatus further comprises a spacer member retained on the valve stem and received in the elongated opening in the slider plate to slidably support the slider plate on the valve stem such that the slider plate is selectively movable from a position wherein the slider plate contacts a portion of the valve body when the flow control member is in either of the first and second positions to retain the flow control member in either of the first and second positions to another position wherein the slider plate does not contact a portion of the valve body to enable the valve stem to be rotated.

Yet another embodiment of the present invention comprises a valve that has a valve body and a flow control member that is operably supported within the valve body. The flow control member is selectively rotatable between a first position and a second position and has an actuator stem portion that protrudes out of the valve body. An actuator handle is attached to the actuator stem portion and serves to define a handle axis. The valve further comprises a slider plate that is movably supported on the valve body and that is selectively movable along a locking axis that is substantially transverse to the handle axis. The slider plate is selectively movable between a position wherein the slider plate contacts a portion of the valve body when the flow control member is in either of first and second positions to retain the flow control member in the first or second position and another position wherein the slider plate does not engage the portion of the valve body.

Another embodiment of the present invention comprises a valve that includes a valve body and a rotatable flow control member that is operably supported in the valve body. The flow control member is selectively rotatable about an actuator axis to first and second positions upon applications of rotary forces to an actuator stem portion of the rotatable control member that protrudes from the valve body. The valve further comprises a slider plate that is slidably journaled on the actuator stem portion. The slider plate is selectively movable from a position wherein the slider plate contacts a portion of the valve body when the flow control member is in either of first and second positions to another position wherein the slider plate does not contact a portion of the valve body to enable the actuator stem to be rotated about the actuator axis.

It is a feature of the present invention to provide a valve lock apparatus that is relatively easy to manufacture, install and operate.

It is another feature of the present invention to provide a lock apparatus for a valve that prevents the inadvertent actuation of the flow control member of the valve.

Another feature of the present invention is to provide a lock apparatus that can be used in connection with a variety of different valves for preventing unauthorized actuation of the flow control member of the valve.

Still another feature of the present invention is to provide a lock apparatus that can be retrofitted onto a variety of different valves.

Yet another feature of the present invention is to provide a valve lock apparatus that can be used in connection with a variety of different conventional locks to prevent the unauthorized actuation of a valve.

Another feature of the present invention is to provide a valve that employs a locking apparatus having the various advantages and features stated above.

Accordingly, the present invention provides solutions to the shortcomings of prior valve locking assemblies and constructions. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein:

FIG. 5 is an exploded assembly view of the valve of FIGS. 1–4;

FIG. 6 is a perspective view of a spacer member of the present invention;

FIG. 7 is a perspective view of a slider plate of the present invention;

DETAILED DESCRIPTION OF THE PREFERRED EMBODIMENTS

Figure 1:
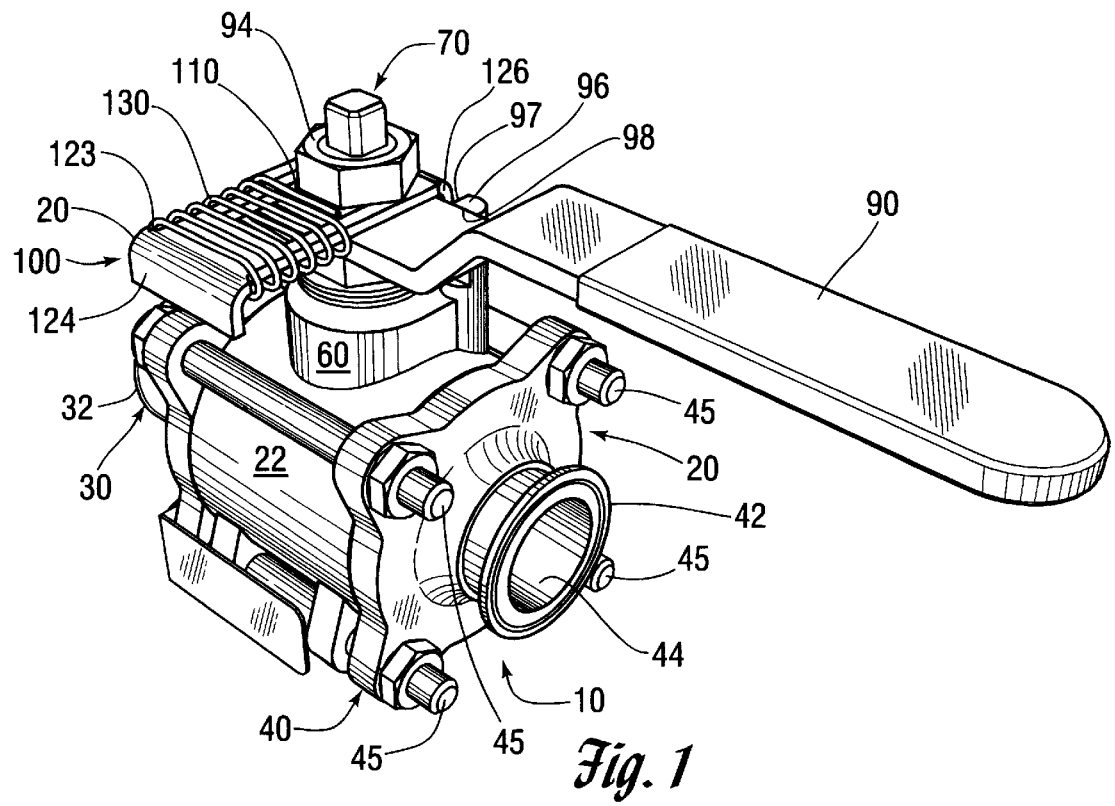
FIG. 1 is a perspective view of a valve of the present invention.

Referring now to the drawings for the purposes of illustrating the present preferred embodiments of the invention only and not for the purposes of limiting the same, the Figures show a valve 10 that has a lock apparatus installed thereon that is constructed in accordance with the present invention. Although the lock apparatus is described herein in connection with a ball valve, those of ordinary skill in the art will appreciate that the present lock apparatus may be effectively employed with other valves such as butterfly valves, plug valves, etc. without departing from the spirit and scope of the present invention. Accordingly, the protection afforded to the present lock assembly should not be limited solely to use in connection with a ball valve.

Figure 2:
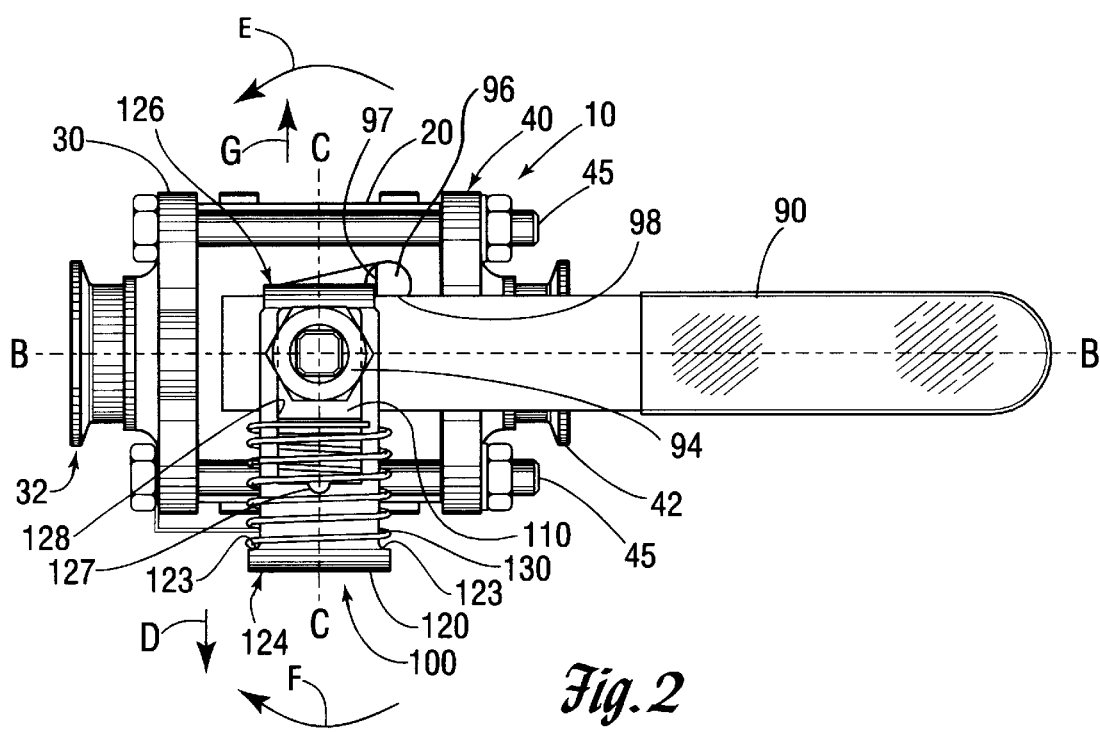
FIG. 2 is a top view of the valve of FIG. 1 in an open position.
Figure 3:
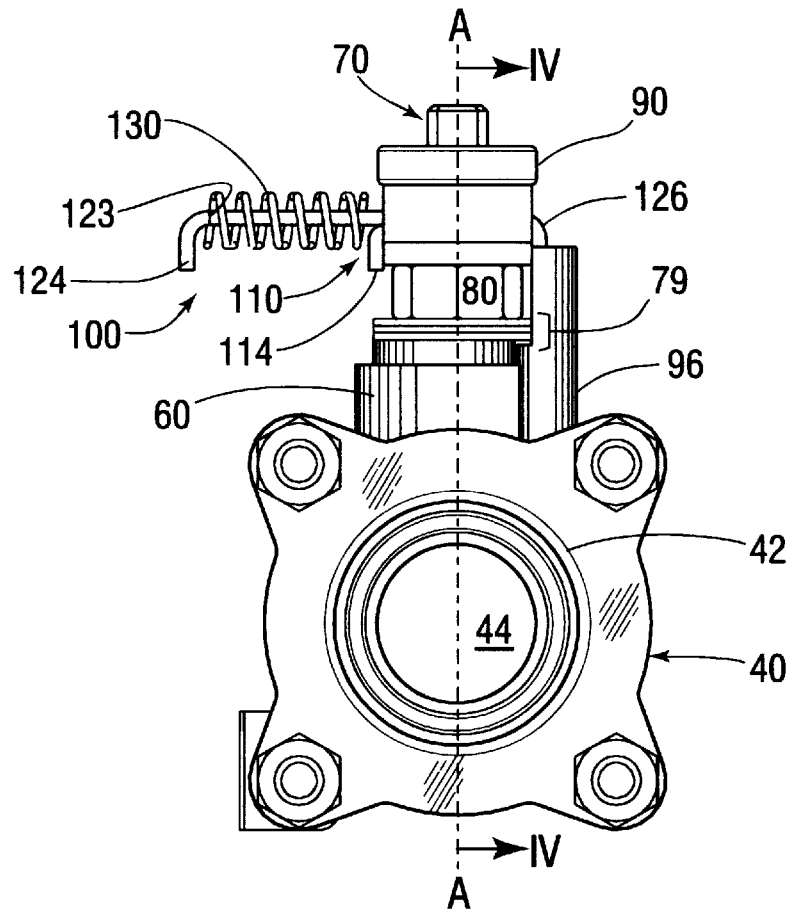
FIG. 3 is a right side elevational view of the valve of FIGS. 1 and 2.
Figure 4:
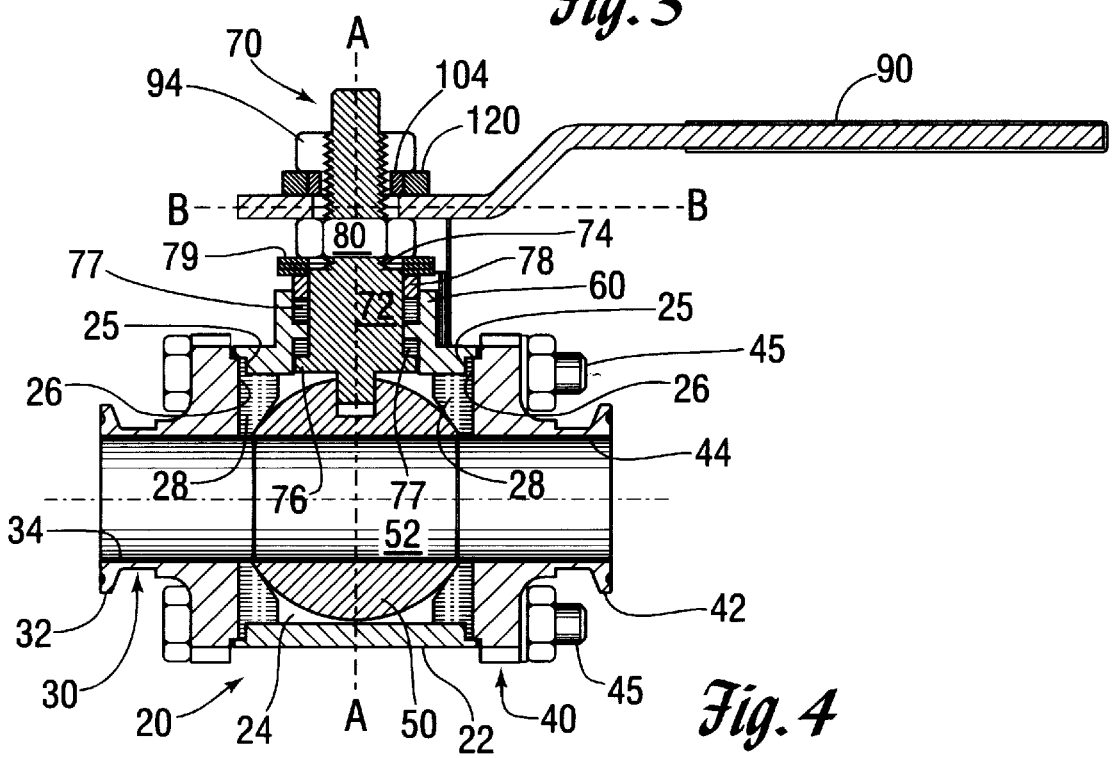
FIG. 4 is a cross-sectional view of the valve of FIGS. 1–3 taken along line IV—IV in FIG. 3.

More particularly and with reference to FIGS. 1–5, the valve 10 includes a valve body 20 that comprises a central body portion 22 and two end portions (30, 40). While the valve body 20 of the valve 10 disclosed herein is consists of a central portion 22 and two end portions (30, 40), those of ordinary skill in the art will readily appreciate that the valve body 20 may be provided in a variety of different configurations and constructions. In this embodiment, end portion 30 has an inlet connector 32 that defines an inlet port 34. See FIG. 4. Similarly, end portion 40 has an outlet connector 42 that defines an outlet port 44. The central portion 22 of the valve body 20 defines a flow control chamber 24 for receiving a flow control member 50 therein. The first and second end portions (30, 40) are oriented on their respective ends of the central portion 22 as shown in FIG. 4 and are affixed thereto by capscrews 45 that extend through end portion 30 and end portion 40. To achieve a substantially fluid-tight seal between the first and second end portions (30, 40) and the central portion 22, commercially available seal members 26 are seated in grooves 25 in the central portion 22 as shown in FIG. 4. Those of ordinary skill in the art will appreciate that such "three-part" body assembly serves to facilitate easy assembly and disassembly of the valve 10. It will be further appreciated however, that a myriad of other valve body configurations could be employed. The reader will also understand that connectors (32, 42) may comprise slip fit connectors, threaded connectors, flanged connectors, etc. to facilitate attachment of the valve 10 to an inlet conduit (not shown) and an outlet conduit (not shown) that have a fluid passing therethrough. The central portion 22, the first end portion 30, and the second end portion 40 of the valve body 20 may be fabricated from a variety of materials such as steel, stainless steel, polymeric materials, etc. that are compatible with the type of fluid being handled. Those of ordinary skill in the art will appreciate that a variety of different fabrication methods may also be used to reduce the weight of the valve and manufacturing time. For example, depending upon the type of material employed, the valve body 20 components may be wrought or cast.

In this embodiment, the flow control member 50 is ball-shaped and has an axial flow passage 52 extending therethrough. Those of ordinary skill in the art will appreciate that the flow control member 50 may be fabricated from, for example, steel, stainless steel, polymeric materials, etc. that are compatible with the types of fluids to be handled. The flow control member 50 is rotatably supported within the flow control chamber 24 by a pair of conventional valve seats 28. When the passage 52 in the flow control member 50 is aligned with the ports (34, 44), fluid passing into the valve 10 through the entry port 34 flows through the flow passage 52 and exits the valve 10 through the exit port 44. To close the valve 10, the flow control member 50 is rotated approximately 90° until the passage is oriented 90° with respect to the inlet and outlet ports (34, 44) and the body portion of the flow control member 50 blocks the inlet and outlet ports (34, 44). When the valve 10 is in that position, the flow control member 50 prevents fluid from flowing through the valve 10.

To facilitate selective rotation of the flow control member 50 about an actuation axis A—A, a valve stem 70 is attached to the flow control member 50 in a conventional manner or it may be integrally formed therewith. As can be seen in FIGS. 1–5, the valve stem 70 is rotatably supported by a bonnet 60 formed in the in the central portion 22 of the valve body 20. As can be seen in FIG. 4, the valve stem 70 may have a lower portion 72 that is rotatably supported within the bonnet 60 and an upper threaded portion 74 for receiving an actuator handle and nut arrangement as will be discussed in further detail below.

A variety of methods exist for rotatably supporting the valve stem 70 within the bonnet 60 while establishing a substantially fluid-tight seal between the stem 70 and the bonnet 60. In the embodiment depicted in FIG. 4, a flange 76 is formed on the lower portion of the valve stem 70 for supporting commercially available packing material 77 thereon. The packing material 77 serves to lubricate and rotatably support the valve stem 70 within the bonnet 60 while establishing a fluid-tight seal between the valve stem 70 and the bonnet 60. A follower member 78 is slidably journaled on the stem 73 and serves to compress the packing material 77 as needed. To facilitate a desired amount of pressure on the packing material 77, one or more spring washers 79 are journaled on the valve stem 70 for contact with the follower 78. The spring washers 79 are then compressed against the follower 78 by a nut 80 that is threaded onto the threaded portion 74 of the stem 70 as shown in FIG. 4. Those of ordinary skill in the art will appreciate that the spring washers 79 serve to maintain a desired amount of pressure on the follower 78 which, in turn, compresses the packing material 77 during operation.

As the present Detailed Description of the Preferred Embodiments proceeds, the skill artisan will appreciate that valve 10 may be constructed in a myriad of different manners and may comprise a butterfly valve, plug valve, etc. As can be seen in FIG. 4, the threaded portion 74 of the valve stem 70 protrudes out of the bonnet 60. In this embodiment, a handle 90 is received on the stem portion 74 to enable the stem 70 and, ultimately, the flow control member 50 to be selectively rotated about actuation axis A—A between open and closed positions. As shown in FIG. 5, the section 73 of the stem 70 adapted to receive the handle 90 has a pair of opposed flat surfaces 75 thereon. A complementary shaped bore 92 is provided through one end of the handle 90 such that the handle 90 may inserted onto the stem portion 73 and engage the flat surfaces 75 thereon. Those of ordinary skill in the art will appreciate that when the handle 90 is received on the stem 70 as shown in FIG. 4, the handle 90 cannot rotate relative to the stem 70. Thus, when a rotary force is applied to the handle 90, the handle 90 and the stem 70 are rotated about the axis A—A. The handle 90 defines a first or "handle axis" B—B that is substantially perpendicular to the actuator axis A—A. See FIG. 2.

The lock apparatus 100 of the present invention will now be described with reference to FIGS. 1–7. In this embodiment, a spacer member 110 configured as shown in FIG. 6 is journaled on the stem portion 74. The spacer member 110 is fabricated from, for example, 10 gauge sheet metal (i.e., steel, stainless steel, etc.) or other suitable material and has an elongated body portion 112 that has a "first" downwardly protruding tab 114 formed on one end thereof. Those of ordinary skill in the art will appreciate that the material comprising the spacer could vary depending upon valve size. The rear corners 116 of the body portion 112 may be clipped at 45° angles as shown in FIG. 6. A bore 118 is provided through the body portion 112 to enable the spacer 110 to be journaled on the stem portion 74 as shown in FIGS. 2–4.

The present lock apparatus 100 also includes a slider plate 120 configured as shown in FIG. 7. The slider plate 120 is fabricated from 11 gauge sheet metal (i.e., steel, stainless steel, etc.) or other suitable material and has an elongated body portion 122 that has a primary tab 124 formed on one end thereof and a secondary tab 126 formed on the other end thereof. Those of ordinary skill in the art will appreciate that the composition of the slider plate could vary depending upon valve size. An elongated opening 128 is provided through the body portion 122 of the slider plate 120 to enable the slider plate 120 to receive the spacer member 110 therein. The opening 128 is sized relative to the spacer member 110 such that the slider plate 120 may be selectively moved along a second or "locking axis" C—C that is substantially transverse to the handle axis B—B. See FIG. 2. The spacer member 110 and the slider plate 120 are retained on the stem portion 74 by a second nut 94 that threadably engages the threads on the shaft portion 74. In this embodiment, a "biaser" in the form of a compression spring 130 is received on the slider plate 120 for biasing the slider plate 120 along the locking axis C—C in the direction represented by arrow "D". The slider plate 120 has a pair of notches 123 against which one end of the compression spring 130 abuts. The other end of the compression spring 130 abuts the first tab 114 on the spacer member 110.

FIG. 2 depicts the position of the handle 90 when the flow control member 50 is in the open position. When in the open position, the handle 90 abuts a protrusion 96 that is integrally formed on the central portion 22 of the valve body 20. The protrusion 96 has a first contact surface 97 on one side thereof and a second contact surface 98 formed on another side of the protrusion 96. In this embodiment, the first contact surface 97 is substantially perpendicular to the second contact surface 98. The reader will appreciate that when the valve 10 is in the "full open" position (i.e., when the axis of the flow control member passage 52 is coaxially aligned with the axis extending through the inlet port 34 and the outlet port 44 as shown in FIG. 4) the handle 90 abuts the second contact surface 98 of the protrusion 96 to prevent the handle 90 from being further advanced about the actuation axis A—A in the direction represented by arrow "E". See FIG. 2. In addition, when in that open position, a side of the secondary tab 126 abuts the first contact surface 97 on the protrusion 96 to prevent the stem 70 and the flow control member 50 attached thereto from being rotated about the actuation axis A—A in the direction represented by arrow "F". Thus, when the valve 10 is in the open position as shown in FIG. 2, the lock apparatus 100 of the present invention prevents the stem 70 and flow control member 50 from being inadvertently rotated to a closed position.

Figure 8:
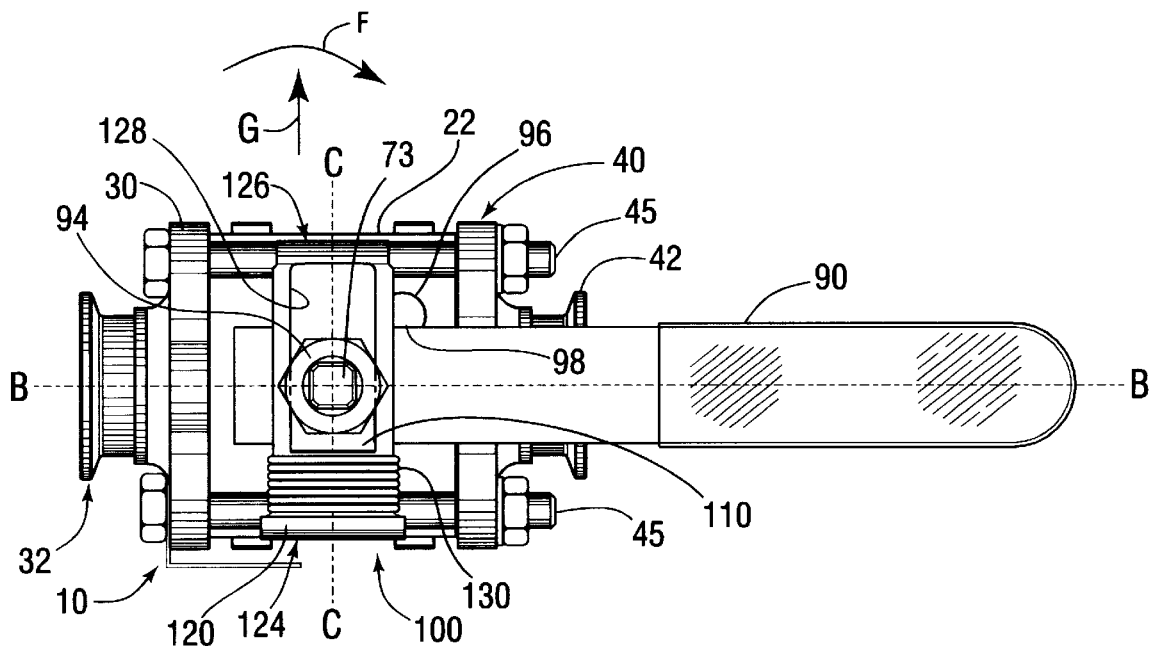
FIG. 8 is a top view of the valve of FIGS. 1–5 with the slider plate biased into a position wherein the stem may be rotated to a closed position.
Figure 9:
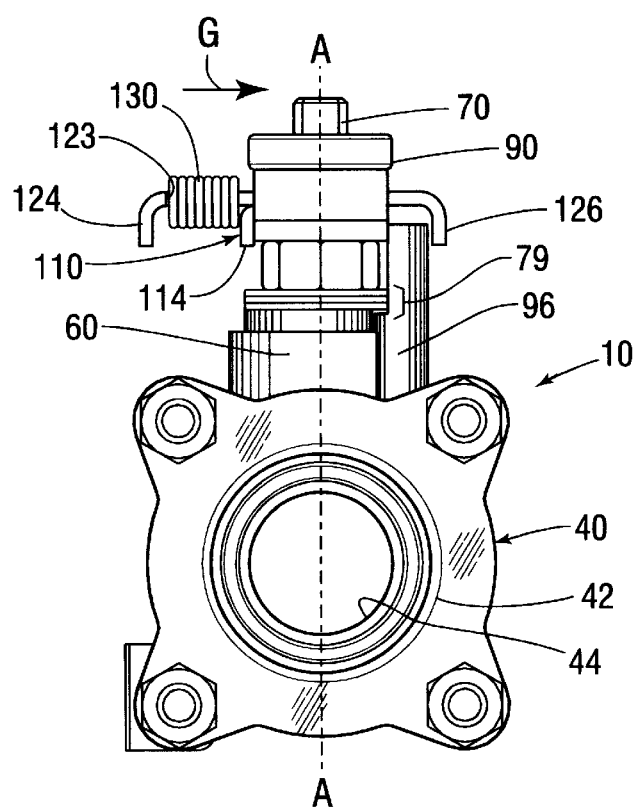
FIG. 9 is a right side elevational view of the valve of FIG. 8.
Figure 10:
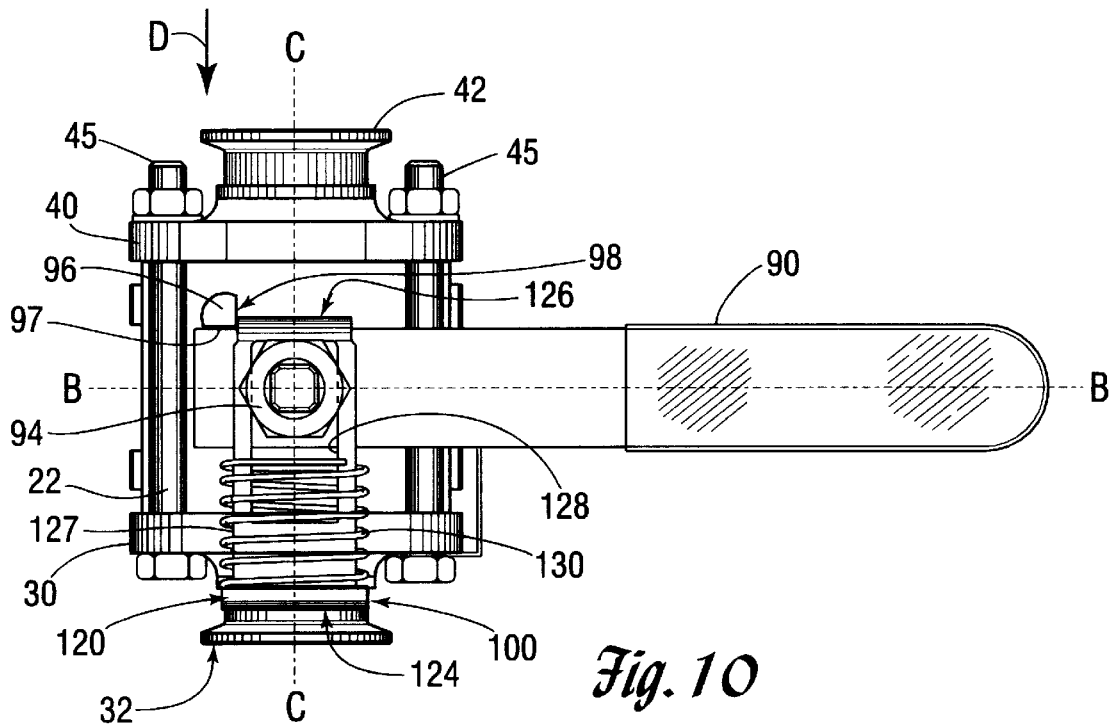
FIG. 10 is a top view of the valve of FIGS. 8 and 9 in a closed position.
Figure 11:
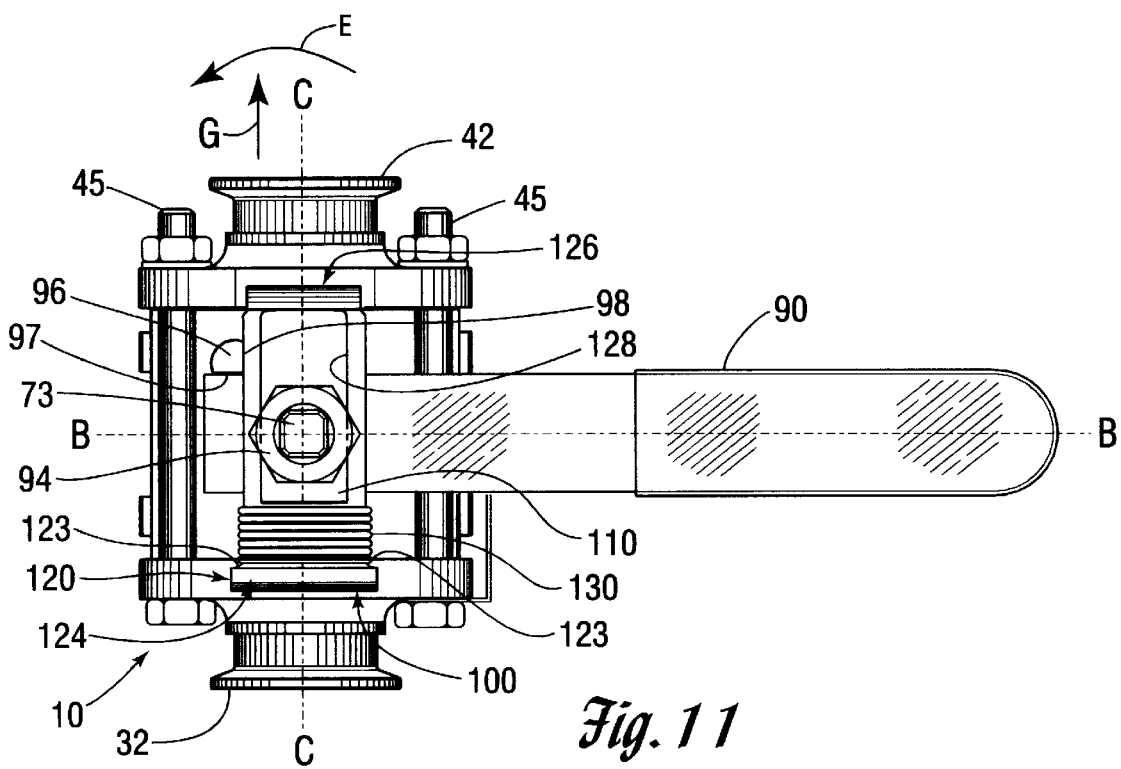
FIG. 11 is another top view of the valve of FIG. 10 with the slider plate thereof biased to a position wherein the stem may be rotated to an open position.

To close the valve 10, the user applies a force to the primary tab 124 on the slider plate 120 to cause the slider plate 120 to move in the "G" direction along locking axis C—C until the secondary tab 126 on the slider plate 120 extends beyond the protrusion 96 a sufficient distance to enable the stem 70 to be rotated about the actuation axis A—A in the "F" direction by grasping the handle 90 and applying an appropriate rotary force thereto. See FIGS. 8 and 9. When the handle 90 has been rotated to a fully closed position (FIG. 10), the handle 90 contacts the first contact surface 97 of the protrusion 96 to prevent further rotation of the handle 90 (and stem 70 and flow control member 50). After the handle 90 has been rotated to the fully closed position, the user discontinues the application of the biasing force to the primary tab 124 on the slider plate 120 and the spring 130 biases the slider plate 120 in the "D" direction such that a side of the secondary tab 126 contacts the second contact surface 98 on the protrusion 96. Thus, when in the fully closed position, the slider plate 120 retains the valve 10 in that position by virtue of the secondary tab 126 contacting the second contact surface 98 on the protrusion 96. To return the valve 10 to the open position, a biasing force is applied to the primary tab 124 to bias the slider plate 120 in the "G" direction until the secondary tab 126 extends beyond the protrusion 96 and the handle 90 is then rotated in the "E" direction. See FIG. 11.

Figure 12:
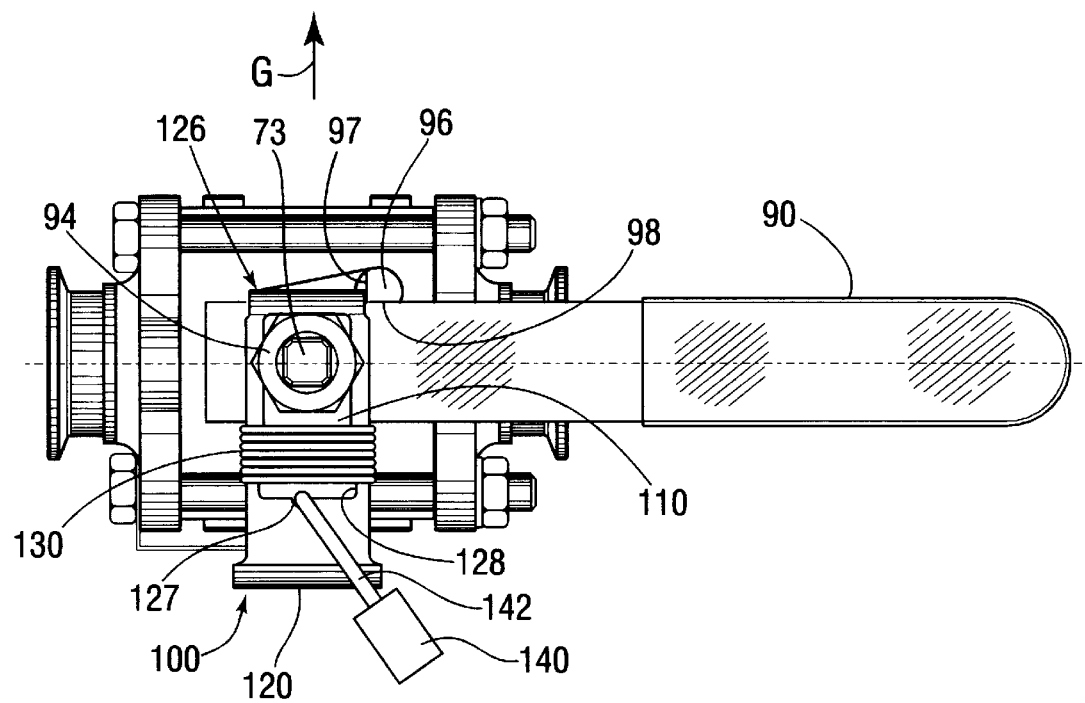
FIG. 12 is a top view of a valve of the present invention wherein a lock has been attached to the locking assembly.
Figure 13:
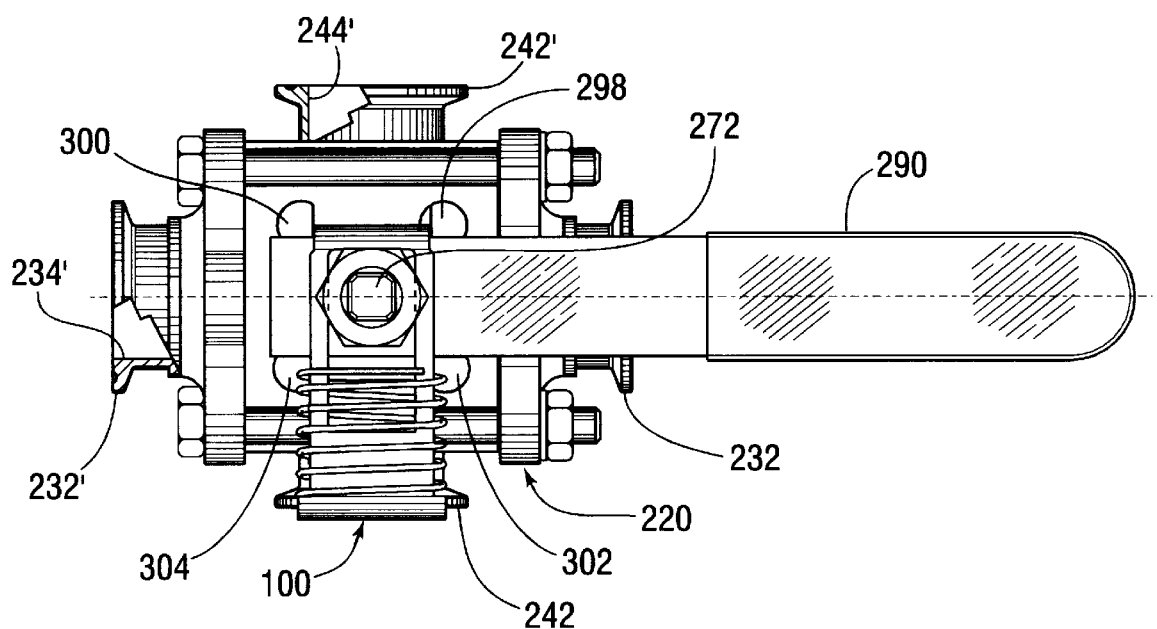
FIG. 13 is a top view of another embodiment of the present invention with the handle thereof retained in a first position.
Figure 14:
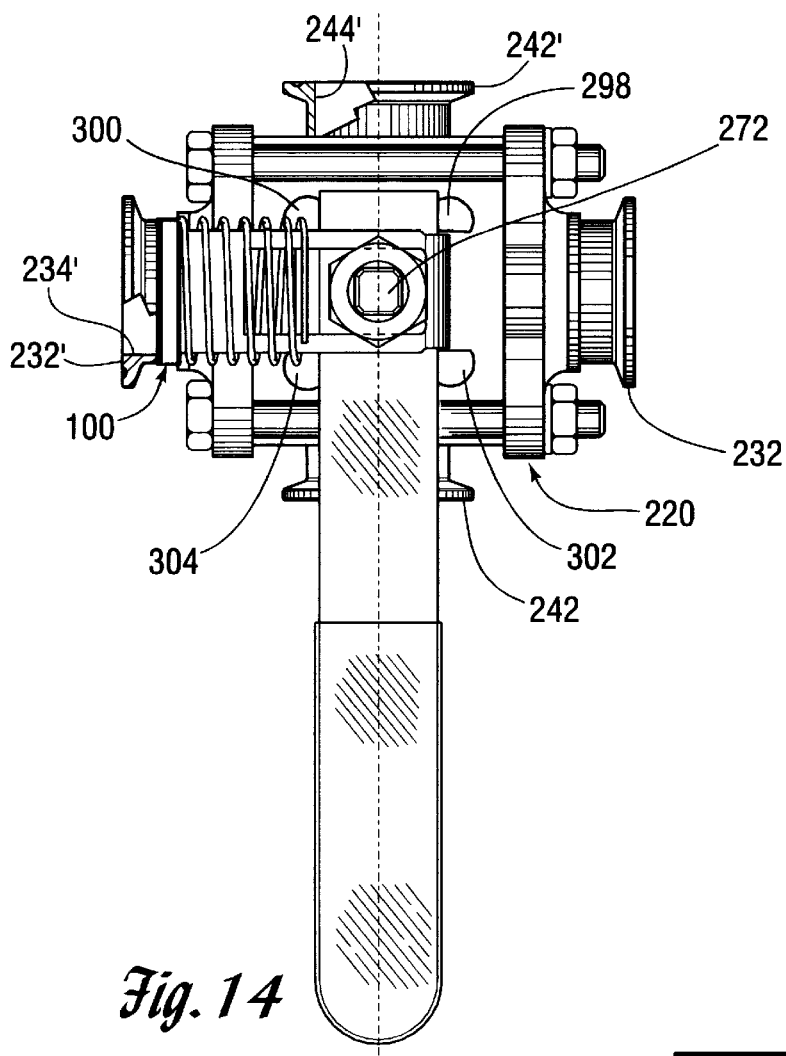
FIG. 14 is another top view of the valve of FIG. 13, with the handle thereof retained in a second position.
Figure 15:
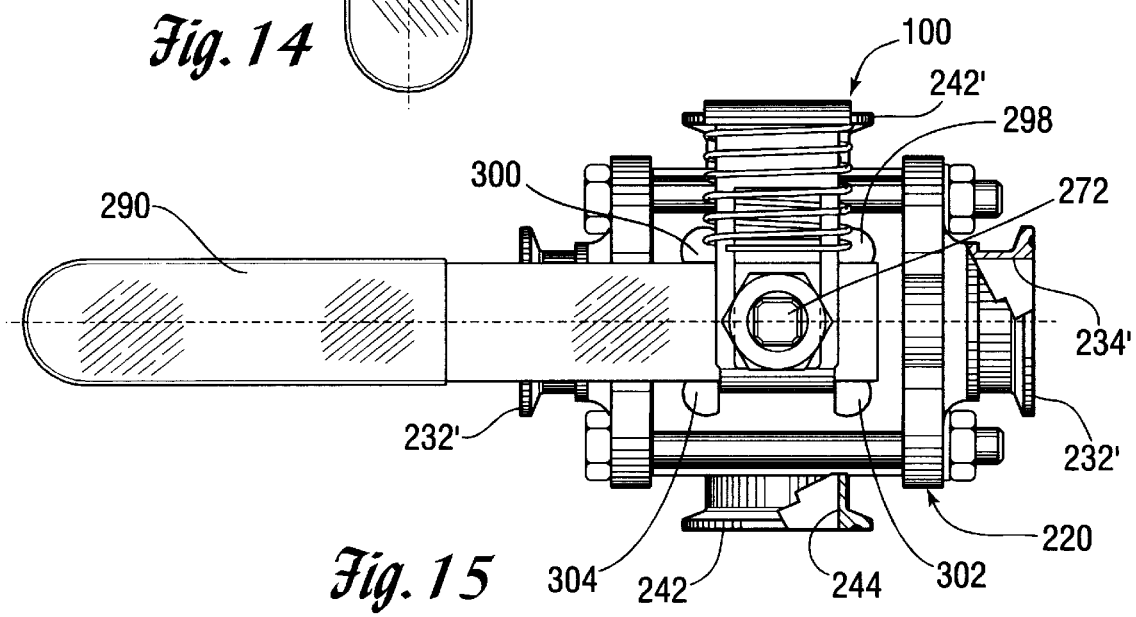
FIG. 15 is another top view of the valve of FIGS. 13 and 14 with the handle thereof retained in a third position.
Figure 16:
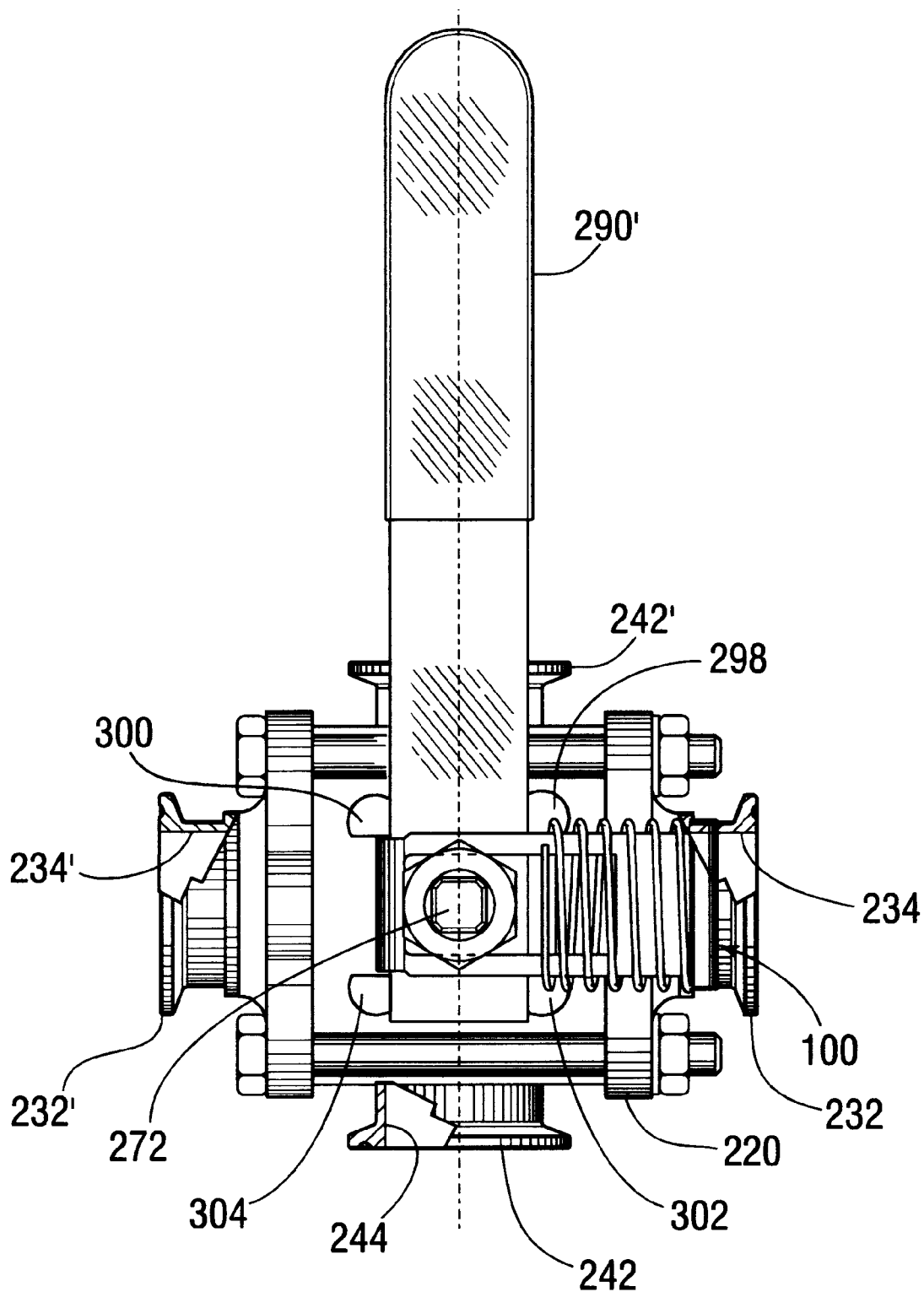
FIG. 16 is another top view of the valve of FIGS. 13–15 with the handle thereof retained in a fourth position.

To lock the valve 10 in the open or closed position, a lock-receiving notch 127 may be provided in the slider plate 120 for accommodating a shank 142 of a lock 140. See FIG. 7. As can be seen in FIG. 12, to lock the valve 10 in position, the spring 130 is biased in the "G" direction on the slider plate 120 to expose a portion of the opening 128 in the slider plate 130 and the lock-receiving notch 127 to enable the lock shank 142 to be hooked therethrough. After the lock shank 142 has been hooked through the opening 128, the spring 130 is released and the lock 140 is locked. The lock 140 prevents the slider plate 120 from being biasable in the direction "G". Thus, when the lock 140 is attached in the above-described manner, the valve 10 cannot be actuated until the lock 140 is removed. The reader will readily appreciate that a variety of different types of locks may be employed with the lock apparatus of the present invention. For example, cable locks, chain locks, combination locks, key-actuatable pad locks, etc. may be used. Thus, the term "lock shank" as used herein should not be limited to the rigid shank portion of a pad lock. Such term may also encompass a lockable chain, cable, etc.

While the present lock apparatus has been illustrated with use in connection with valves that are manually actuated by applying a force to a handle attached to the valve stem, the present invention could also be successfully employed to retain a valve stem in an open or closed position and to lock it in either of such positions if so desired when the valve is rotated by an automatic actuator. Automatic actuators are known in the art and may be electrically or pneumatically actuated. Such devices commonly have a receptacle for receiving an end of the valve stem therein. The stem may be retained in the receptacle by a variety of conventional methods including mounting brackets, screws, etc. When it is desired to actuate the valve, a pneumatic or electric signal is applied to the actuator and the actuator rotates the receptacle and the valve stem in a desired direction. If the locking apparatus of the present invention is employed on a valve that is actuated by an automatic actuator, those of ordinary skill in the art will appreciate that the slider plate must be biased to a position that will permit the stem to be rotated prior to and during rotation of the stem. Thereafter, the slider plate may be released and a lock applied thereto, if so desired.

Those of ordinary skill in the art will also appreciate that the valve lock apparatus of the present invention could be successfully employed in connection with valve bodies that have multiple ports (i.e., three-way valves, four-way valves, etc.) without departing from the spirit and scope of the present invention. Thus, the subject invention should not be limited to valves having two ports and use with such valves. For example, as shown in FIGS. 13–16, the lock apparatus 100 may be used in connection with a valve body 220 that has four connectors (232, 232', 242, 242') that each define a port (234, 234', 244, 244'), respectively. The flow control member (not shown) may have a 90° port therethrough. In this embodiment, four protrusions, a first protrusion 298, a second protrusion 300, a third protrusion 302, and a fourth protrusion 304 are formed on the valve body 220 in the manner described above. However, to permit the valve handle 290 that is attached to the stem 272 of the flow control member to rotate a full 360°, the protrusions (298, 300, 302, 304) are formed so as they do not contact the handle 290. Thus, when the handle 290 is in the position shown in FIG. 13 (a "first" position), fluid can flow through the port 244 and exit port 234 (if a 90° passage is provided through the flow control member). It will be appreciated that when in that position, the handle 290 is retained by virtue of the downwardly protruding secondary tab 126 contacting the protrusions 298 and 300. The handle 290 may be rotated to the position shown in FIG. 14 ("second position") by biasing the slider plate 120 in the "G" direction such that the secondary tab 126 clears the protrusion 298. After the handle has been rotated to the position shown in FIG. 14, the slider plate is released and the handle 290 is retained in position by virtue of the secondary tab 126 contacting the protrusions 298 and 302. When in that position fluid may flow through ports 224 and 234'. To rotate the handle 290 to the position shown in FIG. 15 ("third position"), the slider plate 120 is biased such that the secondary tab 126 clears the protrusion 302. After the handle 290 has been rotated to the position shown in FIG. 15, the slider plate 120 is released. Handle 290 is retained in that position by virtue of the secondary tab 126 contacting the protrusions 302 and 304. When in that position, fluid may flow through ports 242' and 232'. To permit the handle 290 to be rotated to the position shown in FIG. 16 ("fourth position"), the slider plate 120 is biased such that the secondary tab 126 clears the protrusion 304 and the handle 290 is rotated in a clockwise direction. After the handle 290 has been rotated to the position shown in FIG. 16, the slider plate is released and the handle 290 is retained in position by virtue of the secondary tab 126 and protrusions 300 and 304. Thus, the embodiment depicted in FIGS. 13–16 employs the locking apparatus of the present invention to retain the handle 290 in four different positions around an actuation axis. The reader will therefore appreciate that the handle (and the flow control member attached thereto) could be retained in any desirable position about an actuation axis by advantageously locating an appropriate number of protrusions on the valve body such that the handle can be freely rotated above the protrusions and retained in position by releasing the sliding plate to bring the secondary tab into contact with the appropriate protrusion(s). Therefore, the present invention should not be limited to embodiment wherein the handle can be rotated only 90° or 360°. For example, it is conceivable that an appropriate number of protrusions could be employed to selectively retain the handle in a 90°, 180°, 270° or 360° orientation about the actuation axis. Those of ordinary skill in the art will also understand that the handle may be locked in any one the retained positions by application of a lock in the manner described above.

Thus, from the foregoing discussion, it is apparent that the lock apparatus of the present invention is well-suited for use with variety of different valves. The present invention is particularly well adapted for use in connection with butterfly valves, ball valves, plug valves, etc. The present invention also provides a mechanism for preventing the inadvertent actuation of a valve between open and closed positions and can also be used to prevent unauthorized actuation of the valve. The lock apparatus can also be easily retrofitted onto a variety of different existing valves. Also, in valve applications wherein the valve body lacks a protrusion for contacting the slider plate, a bracket may be attached to the valve body for providing abutment surfaces for the slider plate to contact. The present invention is also relatively easy to manufacture and install, unlike many prior valve locking arrangements. Therefore, the present invention represents an improvement over prior valve locking arrangements. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A valve comprising:
   a valve body;
   a rotatable actuator stem protruding from said valve body for selectively rotating a flow control member within said valve body;
   a handle attached to said actuator stem that defines a first axis; and
   a slider plate movably supported on said actuator stem and being selectively sidable along a second axis that is substantially transverse to said first axis to a first retaining position wherein said slider plate contacts a first contact surface on said valve body when said flow control member is in an open position to retain said flow control member in the open position and a second position wherein said slider plate does not contact said first contact surface to permit said actuator stem to be rotated to a closed position.

2. The valve of claim 1 wherein said slider plate contacts a second contact surface on said valve body when said flow control member is in the closed position to retain said flow control member in the closed position.

3. The valve of claim 1 further comprising a biaser on said slider plate for biasing said slider plate into abutting contact with said first contact surface when said flow control member is in the closed position.

4. The valve of claim 2 further comprising a biaser on sad slider plate for biasing said slider plate into abutting contact with said first contact surface on said valve body when said flow control member is in the open position, said biaser further biasing said slider plate into abutting contact with said second abutting surface when said flow control member is in the closed position.

5. A valve, comprising:
   a valve body;
   a rotatable actuator stem protruding from said valve body for selectively rotating a flow control member within said valve body between first and second positions
   a slider plate slidably received on said actuator stem and having an elongated opening therethrough; and
   a spacer member retained on said actuator stem and received in said elongated opening through said slider plate to slidably support said slider plate on said actuator stem such that said slider plate is selectively movable from a position wherein said slider plate contacts a portion of said valve body when said flow control member is in either of the first and second positions to retain said flow control member therein to another position wherein said slider plate does not contact a portion of said valve body to enable said actuator stem to be rotated.

6. The valve of claim 5 wherein said slider plate abuts a first contact surface on said valve body when said flow control member is in the first position and said slider plate abuts a second contact surface on said valve body when said flow control member is in the second position.

7. The valve of claim 6 further comprising a biasing member on said slider plate and contacting said spacer member for biasing said slider plate into abutting contact with the first contact surface on said valve body when said flow control member is in the first position, said biasing member biasing said slider plate into contact with the second contact surface on said valve body when said flow control member is in the second position.

8. The valve of claim 7 wherein said slider plate has a lock-receiving opening therethrough such that when said slider plate is in abutting contact with either of the first or second contact surfaces, a lock shank inserted through said lock-receiving opening prevents said slider plate from being biasable to another position.

9. A valve, comprising:
   a valve body;
   a flow control member operably supported within said valve body and being selectively rotatable between a plurality of desired positions, said flow control member having an actuator stem portion protruding out of said valve body;
   an actuator handle attached to said actuator stem portion and defining a handle axis; and
   a slider plate movably supported on said valve body and being selectively movable along a locking axis that is substantially transverse to said handle axis between a position wherein said slider plate contacts at least a portion of said valve body when said flow control member is in anyone of said desired positions to retain said flow control member therein and another position wherein said slider plate does not engage said at least a portion of said valve body.

10. The valve of claim 9 wherein said valve body has first and second contact surfaces thereon and wherein said slider plate abuts said first contact surface on said valve body when the flow control member is in a first position and said slider plate abuts said second contact surface on said valve body when said flow control member is in a second position.

11. The valve of claim 10 wherein said first and second contact surfaces are formed on a protrusion on said valve body.

12. The valve of claim 11 wherein said protrusion is integrally formed with said valve body.

13. The valve of claim 12 wherein said first contact surface is substantially perpendicular to said second contact surface.

14. The valve of claim 9 wherein said slider plate is slidably journaled on said actuator stem portion.

15. The valve of claim 9 wherein said slider plate is biased into said first position by a biaser received on said slider plate.

16. The valve of claim 15 wherein said slider plate has at least one notch therein and wherein said biaser comprises a spring received on said slider plate and extending between said at least one notch and a portion of the valve.

17. The valve of claim 16 wherein said spring extends between said tab on said slider plate and a spacer member received on the stem.

18. The valve of claim 17 wherein said spacer member is received in an opening in said slider plate.

19. The valve of claim 18 wherein said slider plate further comprises:
   a tab on one end of said slider plate; and
   another tab on another end of said slider plate for selective contact with said portion of the said valve body.

20. The valve of claim 9 wherein said slider plate has a lock-receiving opening therein.

21. The valve of claim 15 wherein said biaser comprises a spring received on said slider plate and extending between a tab thereon and a portion of said valve body.

22. The valve of claim 9 wherein said slider plate abuts first and second portions of said valve body when said flow control member is in a first position.

23. The valve of claim 22 wherein said slider plate abuts said first portion and a third portion of said valve body when said flow control member is in a second position.

24. The valve of claim 23 wherein said slider plate abuts said third portion of said valve body and a fourth portion of said valve body when said flow control member is in a third position.

25. The valve of claim 24 wherein said slider plate contacts said second and fourth portions of said valve body when said flow control member is in said fourth position.

26. The valve of claim 25 wherein said slider plate has a lock-receiving opening therethrough such that when said flow control member is in any one of said first, second, third and fourth positions, a lock shank inserted through said lock-receiving opening prevents said slider plate from being biasable to the another position.

27. A valve, comprising:
   a valve body;
   a rotatable flow control member operably supported in said valve body and being selectively rotatable about an actuator axis to first and second positions upon applications of rotary forces to an actuator stem portion of said rotatable control member that protrudes from said valve body; and
   a slider plate slidably journaled on said actuator stem portion such that said slider plate is selectively movable from a position wherein said slider plate contacts a portion of said valve body when said flow control member is in either of first and second positions to another position wherein said slider plate does not contact said portion of said valve body to enable said actuator stem to be rotated about said actuator axis.

28. The valve of claim 27 wherein said slider plate abuts a first contact surface on said valve body when said flow control member is in the first position and said slider plate abuts a second contact surface on said valve body when said flow control member is in the second position.

29. The valve of claim 28 wherein said first and second contact surfaces are formed on a protrusion integrally formed in said valve body.

30. The valve of claim 28 further comprising a biasing member on said slider plate and contacting said spacer member for biasing said slider plate into abutting contact with the first contact surface on said valve body when said flow control member is in the first position, said biasing member biasing said slider plate into contact with said second contact surface on said valve body when said flow control member is in the second position.

31. The valve of claim 30 wherein said slider plate has a lock-receiving opening therethrough such that when said slider plate is in abutting contact with either of said first or second contact surfaces, a lock shank inserted through said lock-receiving opening prevents said slider plate from being biasable to the another position.

32. A valve lock apparatus, comprising:
   a slider plate having an elongated opening therethrough and a primary tab protruding from one end thereof and a secondary tab protruding from another end thereof;
   a spacer member sized for receipt in said elongated opening in said slider plate and having a valve stem-receiving opening therethrough; and
   a biaser supported on said slider plate between said primary and secondary tabs.

33. The valve lock apparatus of claim 32 wherein said spacer member is sized such that said slider plate can slidably travel thereon.

34. The valve lock apparatus of claim 32 wherein said slider plate further has a notched portion adjacent said elongated opening for receiving a portion of a locking member therethrough.

35. The valve lock apparatus of claim 32 wherein said biaser extends between said primary tab on said slider plate and said first tab on said spacer member.

36. The valve lock apparatus of claim 35 wherein said biaser comprises a spring.

37. The valve lock apparatus of claim 36 wherein one end of said spring abuts notches in said slider plate and another end of said spring abuts said first tab on said spacer member.

* * * * *